United States Patent [19]

Sommer

[11] 4,388,859
[45] Jun. 21, 1983

[54] DEVICE FOR PICKLING PIECES OF MEAT

[76] Inventor: Hans Sommer, Ziegelhütte, Limbach-Heidersbach D6951, Fed. Rep. of Germany

[21] Appl. No.: 232,027
[22] PCT Filed: Jun. 4, 1980
[86] PCT No.: PCT/EP80/00035
  § 371 Date: Feb. 5, 1981
  § 102(e) Date: Jan. 29, 1981
[87] PCT Pub. No.: WO80/02635
  PCT Pub. Date: Dec. 11, 1980

[30] Foreign Application Priority Data

Jun. 5, 1979 [DE] Fed. Rep. of Germany ....... 2922714
Dec. 19, 1979 [DE] Fed. Rep. of Germany ....... 2951033
May 22, 1980 [DE] Fed. Rep. of Germany ....... 3019483

[51] Int. Cl.³ .......................... A23B 4/02; A23B 4/14
[52] U.S. Cl. ........................................ 99/533; 17/25; 99/535
[58] Field of Search ................. 99/487, 494, 516, 535, 99/532, 533; 17/25; 27/21, 22 R, 24 R

[56] References Cited
FOREIGN PATENT DOCUMENTS
2274227 1/1976 France .
2318588 2/1977 France .
2375830 7/1978 France .
862307 3/1961 United Kingdom .

Primary Examiner—Philip R. Coe
Assistant Examiner—Timothy F. Simone
Attorney, Agent, or Firm—Herbert L. Lerner; Laurence A. Greenberg

[57] ABSTRACT

Device for pickling (curing) pieces of meat in a continuous operation with a feeder which leads into the space of two injection needle cylinders which are driven about horizontal axes to pass on the material and stab with their injection needles into the passing-through pieces of meat and in the process inject pickling brine from a piping system provided in the interior of the injection needle cylinders.

This device is improved in the respect that the required pickling brine can be injected quickly, and uniformly distributed as far as possible without losses. This is achieved by a special construction for controlling the inflow of the pickling brine from a hollow space between the hollow bodies of the needle cylinders and a stationary tube for feeding the pickling brine to the holes of the needles. The control is constructed so that only those needles which happen to penetrate into a piece of meat are connected to the hollow body which is filled with pickling brine under pressure.

14 Claims, 8 Drawing Figures

DEVICE FOR PICKLING PIECES OF MEAT

BACKGROUND OF THE INVENTION

1. Field of the Invention

The invention relates to a device for the pickling or curing of pieces of meat in continuous operation with a feeder which leads into the space of at least two injection needle cylinders which are driven to pass-on the material and stab with their injection needles into the passing through pieces of meat and, in the process, inject pickling brine from a piping system provided in the interior of the injection needle cylinders into the pieces of meat.

2. Description of the Prior Art

In one known device of this general type in German Published Non-Prosecuted Application kind (DE-OS) No. 2 700 125, the pieces of meat are transported first between the two cylinders of a pair of blade drums, the blades of which only stab into the pieces of meat. This pair of blade drums merely makes openings in the pieces of meat into which pickling brine enters in a vacuum drum which follows the device and is filled with pickling brine after the pieces of meat have been taken to this drum. The pair of cutting drums further acts as a feeder for the pair of injection needle cylinders which follow and through which pickling brine is injected into the passing pieces of meat. Each injection needle cylinder has a cylinder jacket which contains the injection needles and is placed rotatably and with a close fit on a tube which is fastened to the housing in a stationary manner, and is connected to a pickling brine tank under pressure.

The jacket of the cylinder has radial holes which lead to the radial holes of the injection needles and which are disposed opposite sector-shaped recesses extending to the hollow space in the portion of the tube facing the pieces of meat.

If, however, the pieces of meat are narrower than the width of a needle cylinder, ejection of pickling brine under pressure through the needles which do not penetrate into the meat is unavoidable; this brine is not injected into the meat and must be pumped off again. There is also an undesirable pressure drop in the device for compressing the pickling brine. The pieces of meat are transported into the hereinafore-mentioned vacuum drum via a further conveyor device following this pair of drums.

It is an object of the invention to develop a device of this type further in such a manner that the necessary pickling brine can be injected quickly, uniformly distributed, and free of loss, this injection being be so intensive that the aforementioned vacuum drums can be dispensed with. In the case of narrower pieces of meat, ejection of pickling brine from the needles which do not penetrate into the meat should further be prevented. The sticking of pieces of meat on the injection needles should further be avoided.

SUMMARY OF THE INVENTION

The solution of this problem in the device mentioned at the introduction hereto comprises, according to the invention, of the provision that at least four injection needle cylinders be arranged one behind another with their axes parallel in the transport direction with a safety distance between the points of the needles, and that each injection needle cylinder is formed of a cylindrical hollow body which is provided with radial holes and into which injection needles provided with longitudinal holes closed on the side facing the axis of rotation are inserted radially movably; that within the hollow body of the needle cylinders a tube which is fastened to the housing in a stationary manner is provided with holes, is connected to a pickling brine tank under pressure, and is arranged concentrically to the hollow body, around which tube the cylinders can rotate; that the inner diameter of the hollow bodies is larger than the outer diameter of the tube and that the tube has a flat facing the passing pieces of meat; and that the injection needles extend into the hollow space between the tube and the hollow body so far that they touch the outside surface of the tube; that furthermore, the injection needles have in the region of the hollow bodies at least one additional hole which extends perpendicularly to the longitudinal hole and which permits pickling brine to penetrate into the hollow space between the tube and the hollow body filled with pickling brine under pressure if the hollow needles are shifted toward the axis of rotation and thus permit pickling brine to penetrate into the hollow needles under pressure.

As mentioned hereinbefore, the flat of the tube which can be attained by milling away a segment from the circular shape of the cross section faces the pieces of meat passing the device. Those injection needles of the cylinder which do not penetrate into the meat then come to rest in the hollow space between the inner surface of the cylinder and the outer surfaces of the tube. The radial holes disposed perpendicularly to the longitudinal hole are then located inside the hollow body of the cylinder, so that no pickling brine can penetrate into the hollow needles. Only when the needles reach the flat can they be moved in direction toward the axis of rotation upon penetrating into a piece of meat, so that only then can the radial holes get into the hollow space between the hollow body and the tube, and the pickling brine can penetrate under pressure into the hollow needle and, therefore, into the piece of meat. Those needles, at this point, which cannot be moved inwardly due to the penetration into the meat, are under the pressure of the pickling brine and cannot fall downwardly even if they are arranged at the lower drum, so that spraying of the pickling brine about outside the piece of meat is prevented there.

According to another feature of the invention, a tube is provided at its end with sealing bushings about which the sealing cylinders can rotate. This prevents loss of pickling brine when the injection cylinders rotate.

Advantageously the injection needles have on the side facing the axis of rotation a hemispherical closing plug which is formed of a material resistant to pickling brine and which rests against the surface of the tube.

According to the invention, a further solution to this problem lies in that each injection needle cylinder has a tubular cylinder jacket which receives the injection needles and is placed rotatably and with a close fit on a tube which is fastened to the housing in a stationary manner, and is connected to a pickling brine tank under pressure; that the cylinder jacket has radial holes which lead to the radial holes of the injection needles and opposite which are recesses in the tube which extend to the hollow space; and that these recesses are provided only at the portion of the tube facing the passing pieces of meat. While this device is of simpler design than the device mentioned at the introduction thereto, it has a disadvantage in that, if the width of the pieces of meat varies greatly, the pickling brine is ejected from those needles which do not penetrate into the meat, and cannot be utilized.

According to the invention, tubes are ground off at the free end thereof at an acute angle to the needle axis serve advantageously as the injection needles.

According to the invention, the injection needles can have a roof-shaped ground counter surface located outside the injection opening.

In a preferred embodiment of the invention, the injection needles have a circular or elliptical cross section at least in the piercing portion or have a similar rounded shape.

In one practical embodiment of the invention two injection needle cylinders are always arranged one above each other and in the area of the injection needle cylinders, sliders for the pieces of meat passing between the drums of the injection needle cylinders are provided, which are formed of several respective sliding bars which extend in the travel direction in gaps between the injection needles, are connected to each other and are positioned in supports at the housing and which allow motion of the sliders backwardly, increasing the distance from the opposite slider, against the force of a restoring element, and forwardly up to a stop.

The pieces of meat are thus guided approximately in the central plane between the needle cylinders arranged adjacent one another, and the pieces of meat are prevented from getting stuck on the needles.

In a further embodiment of the invention, at least two injection needle cylinders are arranged at a safe distance between the points of the needles one behind the other as seen in the transport direction, with their axes parallel and their axes of rotation in one plane, and underneath the injection needle cylinders, a co-traveling conveyer device is provided, the drive of which is coupled to the drive of the injection needle cylinders, and in the vicinity of the injection needle cylinders several sliding bars are provided below their axes of rotation in the spaces between the needle circles, the bars being connected to each other, and being adjustable in vertical direction serving as stripper rakes of the pieces of meat.

Advantageously, the conveyor device comprises an endless belt formed of several segments which are connected together in an articulating manner.

Further details and advantageous further embodiments of the invention will be seen from the drawings and the corresponding description.

BRIEF DESCRIPTION OF THE DRAWINGS

There are shown in

DESCRIPTION OF THE PREFERRED EMBODIMENT

In the drawings, the housing in which, for instance two pairs of injection cylinders consisting of two injection cylinders 2 are rotatably arranged, is designated with 1.

The pieces of meat are brought up by a feeder 8 and taken in the direction of the arrow to the space between the first two injection needle cylinders 2.

The injection needle cylinders are driven synchronously by drive elements not shown. The cylinders of a cylinder pair are always driven in opposite directions of rotation. The needle circles of a pair of cylinders are always staggered so that they do not touch each other although the length of the needles is so large that their tips extend beyond the central plane 26 between the pairs of cylinders.

At the circumference of the injection needle cylinders, radial injection needles 30 are provided. The tips of the injection needles cannot touch the tips of the adjacent needle cylinders because the needle cylinders with their injection needles are staggered. However, a safety distance can also be provided between the injection needle cylinders, into which the tips of the injection needles do not extend.

Figure 1:
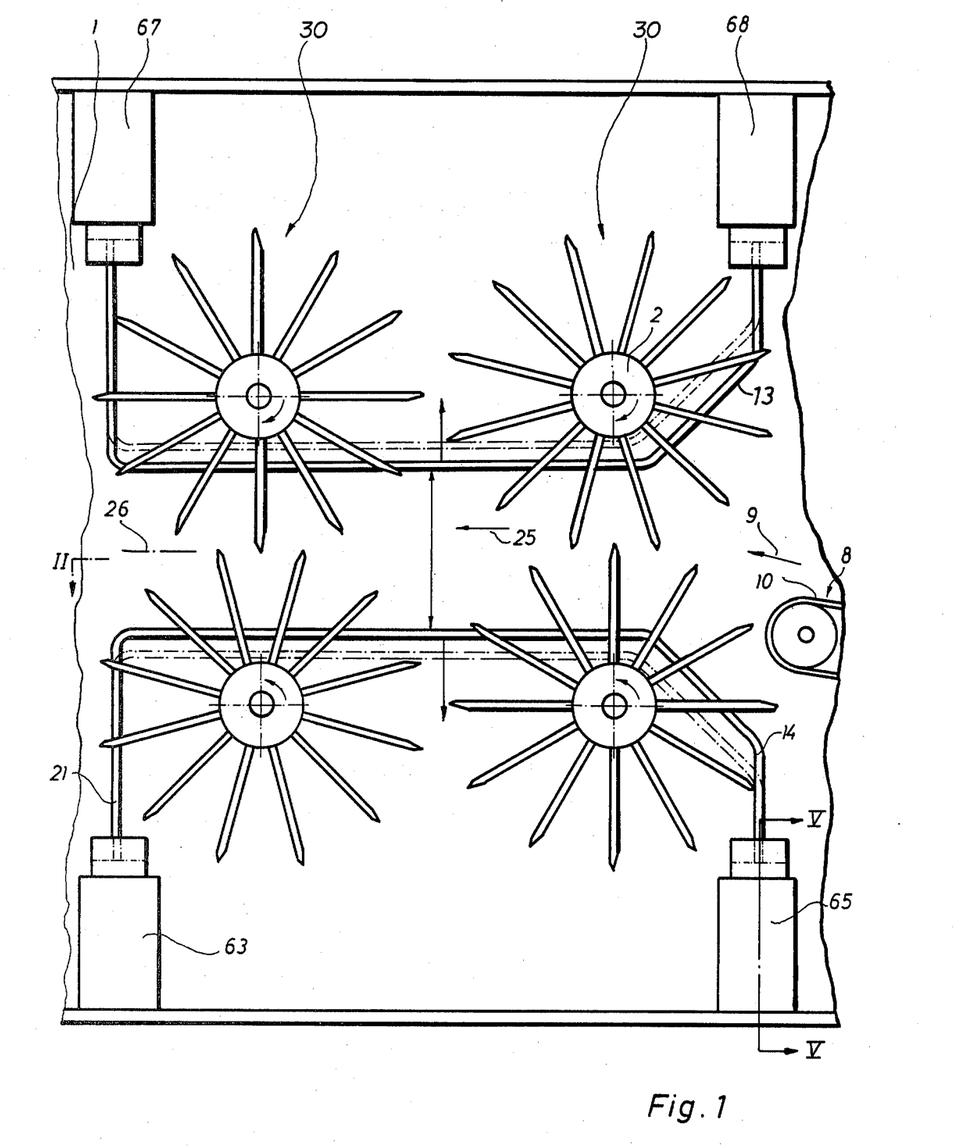
FIG. 1, a device according to the invention with two pairs of cylinders in a vertical longitudinal cross section, FIG. 2, a horizontal section from FIG. 1, FIG. 3, a vertical section through a needle cylinder, FIG. 4, a needle cylinder in a perspective view, FIG. 5, an injection needle, FIG. 6, a device according to the invention with needle cylinders arranged side by side, FIG. 7, a section through a needle cylinder corresponding to the second solution and in FIG. 8, a section through a needle cylinder from FIG. 7.
Figure 2:
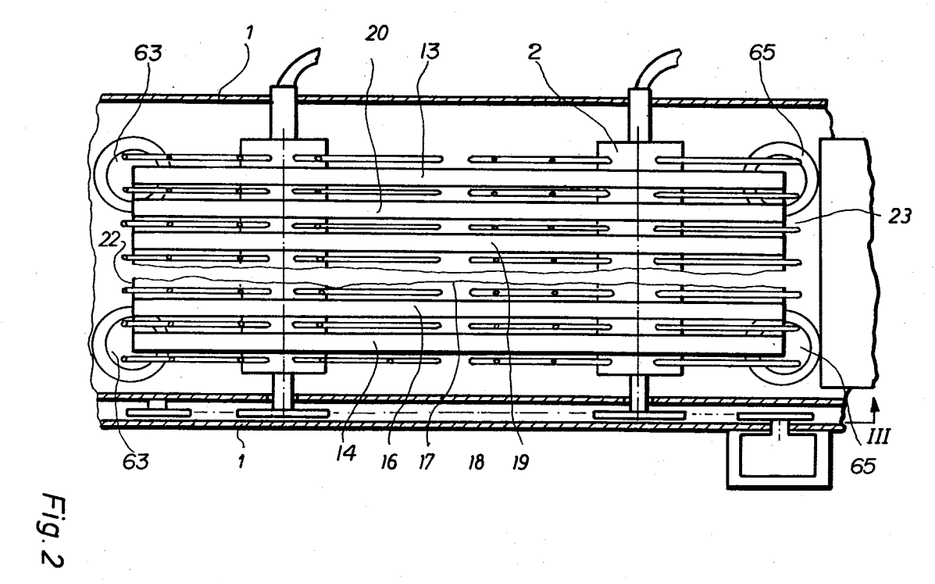
Figure 3:
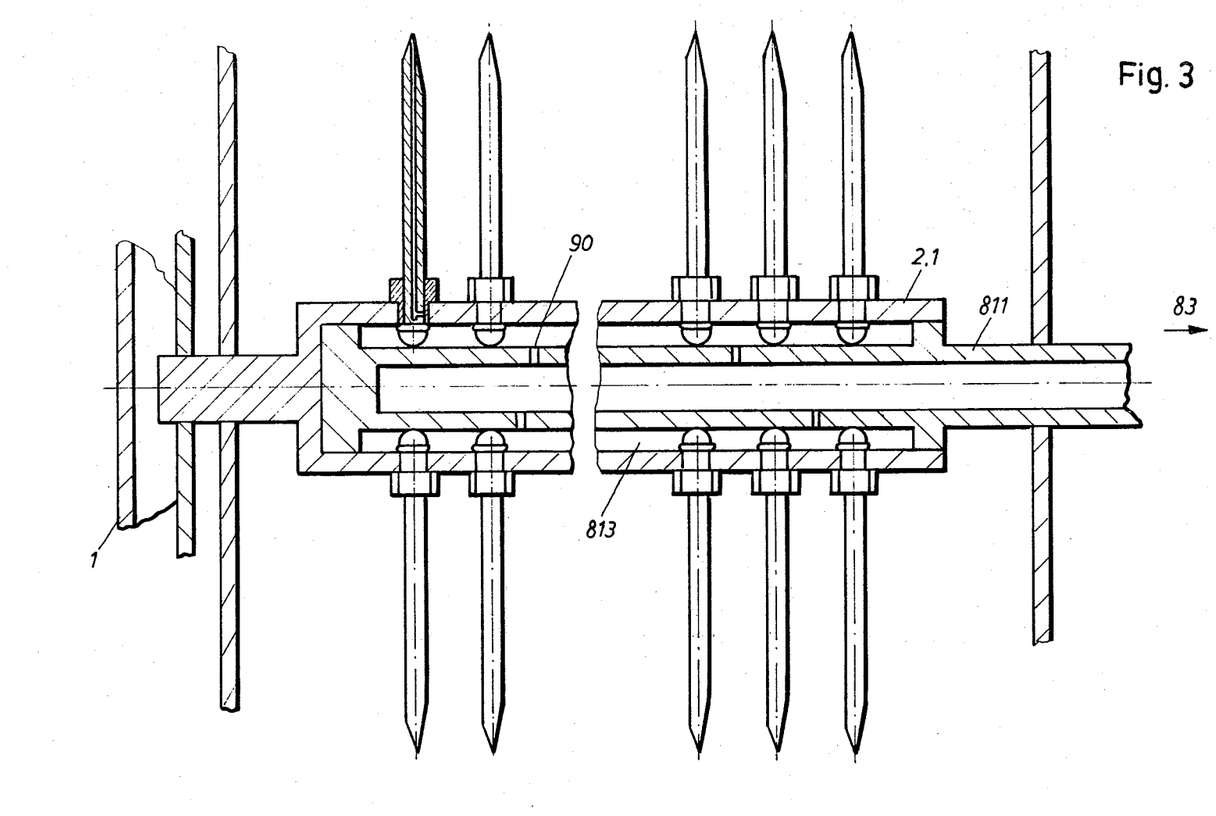
Figure 4:
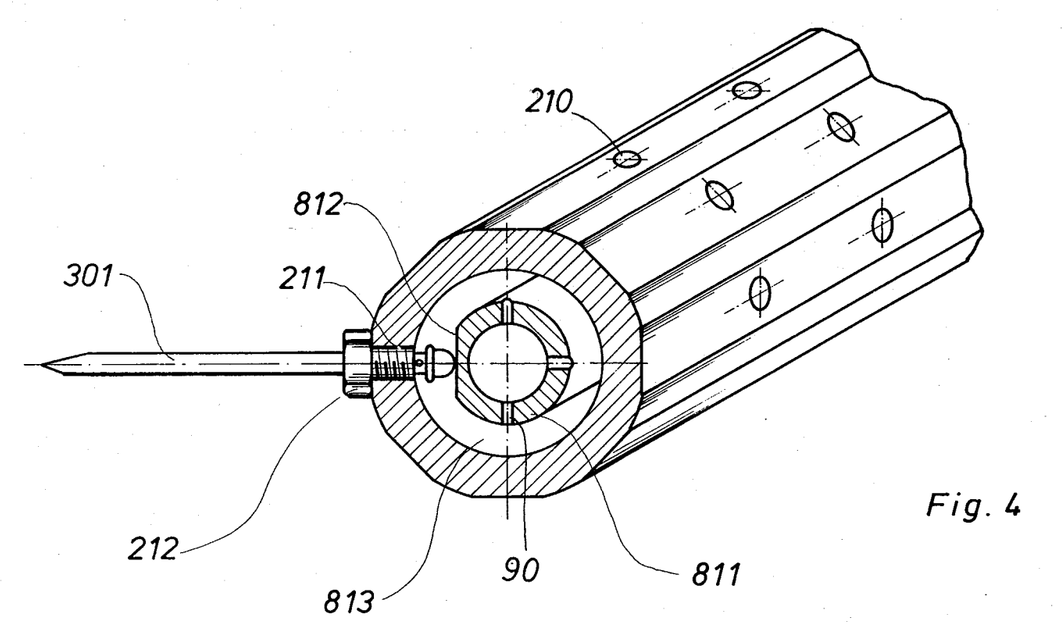
Figure 5:
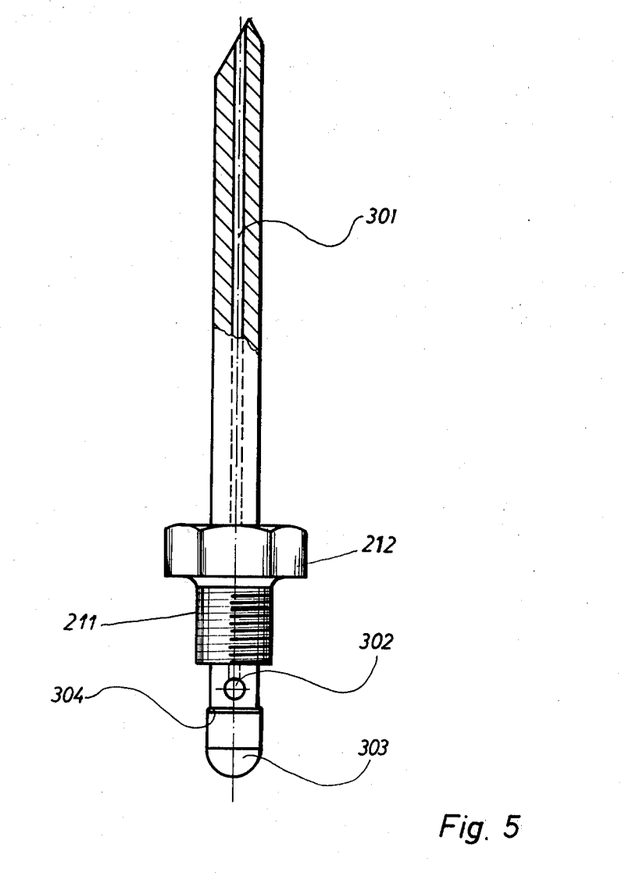

The needle cylinders 2 of each of the cylinder pairs are of identical design as is shown particularly in FIG. 3. Each needle cylinder is constructed from a hollow body 2.1 which is arranged rotatably concentrically with a tube 811 which is fastened fixed to the housing 1. The tube 811 is provided with radial holes 90 and is connected to a pickling brine tank 83. The inside diameter of the hollow body 2.1 is larger than the outside diameter of the tube 811, so that a hollow space 813 of annular cross section is provided between the two. The tube 811 has on its side facing the pieces of meat, i.e. on the lower and upper side, respectively, in FIG. 1, a flat 812, to the purpose of which we will come back later.

The hollow body 2.1 of the cylinders has radial holes 210 in which the injection needles 30, 31 . . . 36 are arranged radially movably. The holes 210 are provided with a thread 211, into which nuts 212 are screwed which guide the injection needles.

The injection needle 30 is provided, like the rest of them, with a longitudinal through hole 301 which is closed off at the end in the hollow space 813 between the tube 811 and the cylinder by a closing plug 303. A shoulder 304 further provided at this end prevents the injection needle from being pulled out of the hole 210 of the hollow body. Above this shoulder is further provided a radial hole 302 which extends to the longitudinal hole 301. The height of the closing plug 303, which has a hemispherical end is just large enough so that it rests against the surface of the tube 811. The radial hole 302 is located in the interior of the nut 212 and therefore has no connection with the hollow space 813.

If the cylinder 2 rotates, the injection needle 30 gets into the vicinity of the flat 812 of the inner tube 81. As long as the needle is outside of a piece of meat it will remain under the pressure of the pickling brine in the same position as it was before in the hollow space 813. Only when the needle pierces a piece of meat is it moved toward the axis of rotation. Only then is the radial hole 302 released and gets into the hollow space 813, and the pickling brine gets into the longitudinal hole 301 under high pressure and thus into the piece of meat to be pickled. In this manner it is successfully prevented that in case of narrower pieces of meat the pickling brine is ejected from the needles into the gap between two pieces of meat which would result in a pressure drop for the other needle cylinders and in unnecessary consumption of energy.

The device according to the invention does not only prevent unnecessary spraying-about of pickling brine, but also permits energy savings in the pressure pump for the pickling bine.

In the drawing, gliders in the form of two yoke-shaped sliding bars are further designated with 13 and 14, which extend parallel to a plane 26 positioned horizontally between the axes of the cylinder pairs, and are connected together by cross pieces.

The sliding bars are fastened to the housing 1 by means of stands 63, 65, 67 and 68 which are movable in the vertical direction. The stands are provided with built-in springs which permit motion in the vertical direction by a given amount. In this manner the pieces of meat are held between the cylinders when they are pierced by the injection needles.

Figure 6:
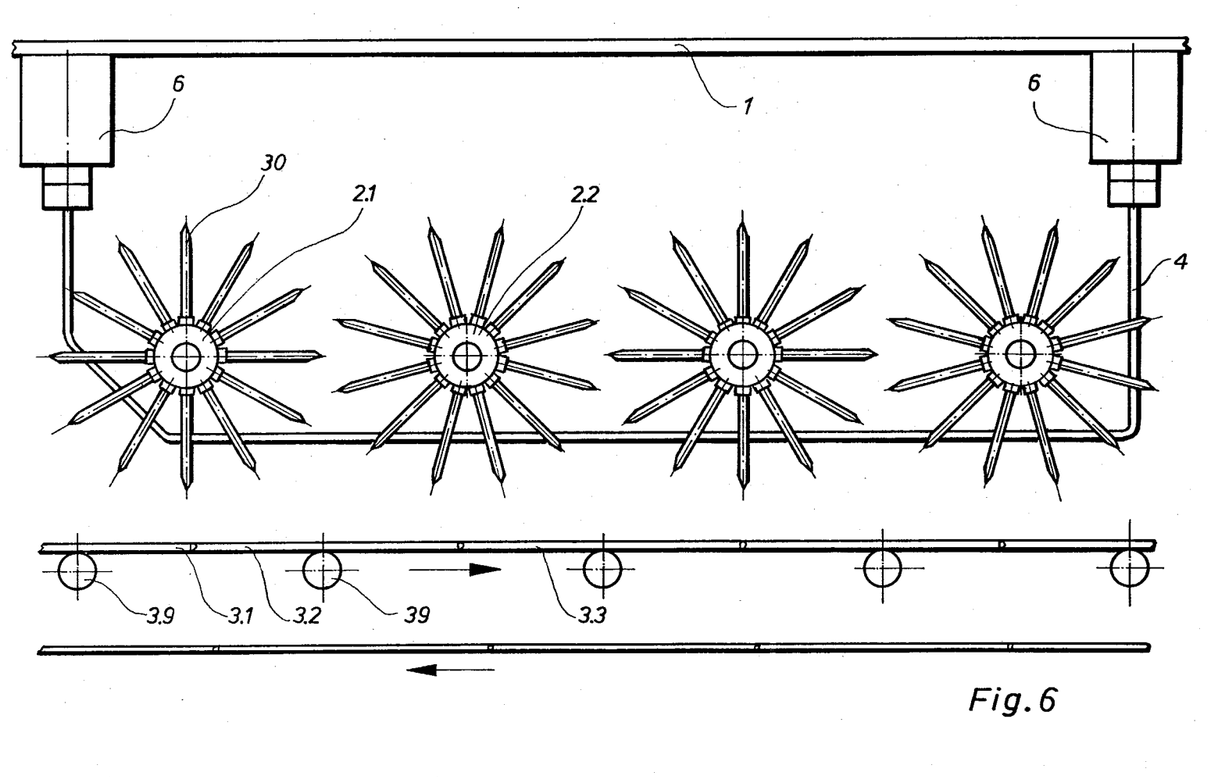

In the embodiment example of the device shown in FIG. 6, the injection needle cylinders 2.1 and 2.2 are supported in the housing 1 with their axes parallel and horizontal. In the drawing, only two injection needle cylinders are shown. The pieces of meat are brought up by a feeder not shown, and are taken via a conveyor device 3 into the space between the first injection cylinder 2.1 and the conveyor device. With 4 are designated two sliding bars which are arranged between the needle circles of the needle cylinders 2.1, 2.2. The sliding bars 4 are bent in the shape of yokes and are connected to each other by cross pieces. The sliding bars extend in a plane which is plane-parallel to the surface of the conveyer device 3. The conveyor device 3 is an endless conveyor belt including several segments 3.1, 3.2, 3.3 which are joined together and are supported by rolls 3.9.

The sliding bars 4 can be moved in the vertical direction up to a position limited by a stop. The distance from the upper edges of the conveyor device corresponds to the thickness of the smallest piece of meat to be pickled. The sliding bars are fastened to the housing 1 via four structural parts 6 permitting adjustment. For larger pieces of meat, the distance between the sliding bars 4 and the conveyor device 3 can be increased by adjusting the former.

Figure 7:
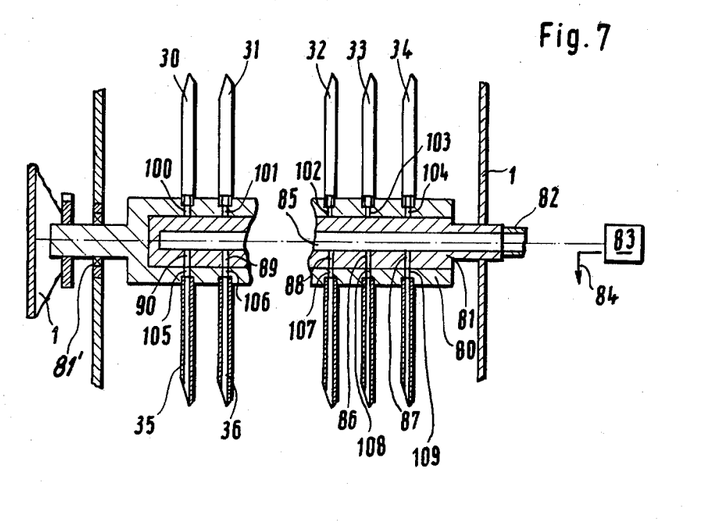

In the needle cylinder shown in cross section in FIG. 7, a cylinder jacket, which is placed with a close fit and rotatably on a tube 81 which is fastened to the housing 1 in a stationary manner with sealing bushings 81', is designated with 80. The tube 81 has a square 82 which is placed in the housing 1 secured against rotation and is extended by a connecting stub each. A pickling brine supply tank 83 is connected to the connecting stubs via pipes. The connecting stub leads into the hollow space of a tube 81. In the tube 81, sector-shaped downward-directed holes 86-90 are formed, which extend into the hollow 85 of the tube 81.

The injection needles 30, 31 are screwed radially into the cylinder jacket 80 and lead into radial canals 100, 101 to 109 . . . of the cylinder jacket 80, which start from the inside of the cylinder jacket 80. During each revolution of the cylinder jacket 80 the canals 100, 101 . . . arrive once above the holes 86-90 of the tube 80, whereby the pickling brine under pressure gets from the hollow space 85 into the injection needle 30 via the radial canals and is injected by the needle into a piece of meat.

Figure 8:
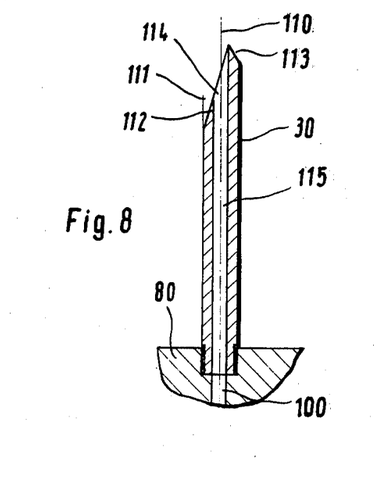

As can be seen from FIG. 8 for the injection needle 30, the injection needles consist of a section of tube which is screwed into the cylinder jacket 80 and is ground off at its free end at an acute angle 111 to the axis 110 of the injection needle 30. The ground surface is designated with 112. At the tip, a roof-like ground counter-surface 113 is provided which, however, does not touch the exit opening 114 of the canal 115 of the injection needle 30. The injection needles are identical, are distributed in several circles over the length at uniform distances and are distributed uniformly over the circumference within the individual circles. The distances between the individual circles are so large that the sliding bars 4 are fit inbetween.

In operation, the pieces of meat arrive successively between the sliding bars 4 and the conveyer device 3 and are seized by the first injection needle cylinder 2.1, the needles of which are plunged into the pieces of meat up to about ⅔ of the respective pieces of meat. As the injection needles are immersed the radial canals of the injection needles just being immersed get in front of the recesses of the tube 80, as described before, so that pickling brine from the injection needle is injected into the meat. The pieces of meat are then passed on and arrive at the action radius of the second injection needle cylinder 2.2 where the injection process is repeated; due to the lateral offset of the needle circles provided, this always takes place between the injection holes which were caused by the first injection needle cylinder 2.1. The piece of meat is then engaged by the next injection needle cylinder 2.3 and the process is repeated until the piece of meat has left the last injection needle cylinder and is pushed out of the space between the sliding bars 4 and the conveyor device 3. It can then be transported on or collected by a conveyer not shown.

The device serves for pickling pieces of meat or curing hams. Such devices are needed in the meat packing industry.

I claim:

1. Device for pickling or curing pieces of meat in continuous operation, comprising a feeder for passing on meat along a given path in a transport direction, a housing, at least four hollow injection needle cylinders being disposed in said given path and having radially directed holes formed therein, a plurality of needles being partially movably disposed in said holes in said cylinders for stabbing and passing on meat, said needles being axially parallel to each other and having points spaced apart one behind the other in said transport direction and longitudinal holes formed in said needles and being closed off at said cylinders, a tube having radial holes formed therein being concentrically disposed within each of said cylinders and being fixed to said housing, said cylinders being rotatable on said tube and having an inside diameter which is smaller than the outside diameter of said tube forming a space therebetween, a brine tank connected to said tube for supplying pickling brine through said radial holes to said space under pressure, said tube having an outer surface with an axially-directed flat area formed thereon, said needles extending within said space, being in contact with said outer surface of said tube and having at least one additional hole formed therein in vicinity of said cylinders extending perpendicularly to and being in contact with said longitudinal hole, said perpendicular holes being in contact with said space for receiving brine when said needles are in contact with said flat area.

2. Device according to claim 1 including sealing bushings disposed at the end of said tubes about which the needle cylinders can rotate.

3. Device for pickling pieces of meat according to claim 1 or 2, wherein two injection needle cylinders are always disposed on top of each other, and including gliders provided in the area of the injection needles of the injection needle cylinder tubes on both sides of the transport path for the pieces of meat passing between the cylinders of the injection needle cylinders, said gliders being formed of several sliding bars extending in said transport direction in gaps between the injection needles, said bars being connected to each other and being mounted at the housing in supports which allow movement of the gliders backwards, increasing the distance from the opposite glider, against the force of a restoring element and forward up to a stop.

4. Device according to claim 1 including a hemispherical closing plug disposed on the injection needles on the side facing the axis of rotation, said plug being formed of a material resistant to pickling brine and being rested against the surface of the tube.

5. Device for pickling or curing pieces of meat in continuous operation, comprising a feeder for passing on meat along a given path in a transport direction, a housing, at least two injection needle cylinder tubes having hollow spaces formed therein, said cylinder tubes being fixed to said housing, a brine tank connected to said cylinder tubes for supplying pickling brine thereto under pressure, jackets being rotatably disposed on said cylinder tubes and having radial holes formed therein, and a plurality of injection needles being disposed on said jacket and having radial holes formed therein, being in communication with said radial holes formed in said jacket, said cylinder tubes having recesses formed therein in communication with said hollow spaces at a given location, said recesses being in communication with said radial holes formed on said jacket when said needles are injected in pieces of meat.

6. Device according to claim 1 or 5, wherein said tubes are ground off at their free end at an acute angle to the needle axis, forming injection needles.

7. Device for pickling pieces of meat according to claim 6, wherein two injection needle cylinders are always disposed on top of each other, and including gliders provided in the area of the injection needles of the injection needle cylinder tubes on both side of the transport path for the pieces of meat passing between the cylinders of the injection needle cylinders, said gliders being formed of several sliding bars extending in said transport direction in gaps between the injection needles, said bars being connected to each other and being mounted at the housing in supports which allow movement of the gliders backwards, increasing the distance from the opposite glider, against the force of a restoring element and forward up to a stop.

8. Device according to claim 6, wherein said injection needles have a roof-like, ground counter surface formed thereon located outside the injection opening.

9. Device according to claim 8, wherein said injection needles have, at least in the insertion portion, a circular or eliptical cross section, or have a similar rounded shape.

10. Device for pickling pieces of meat according to claim 8, wherein two injection needle cylinders are always disposed on top of each other, and including gliders provided in the area of the injection needles of the injection needle cylinder tubes on both sides of the transport path for the pieces of meat passing between the cylinders of the injection needle cylinders, said gliders being formed of several sliding bars extending in said transport direction in gaps between the injection needles, said bars being connected to each other and being mounted at the housing in supports which allow movement of the gliders backwards, increasing the distance from the opposite glider, against the force of a restoring element and forward up to a stop.

11. Device according to claim 6, wherein said injection needles have, at least in the insertion portion, a circular or eliptical cross section, or have a similar rounded shape.

12. Device for pickling pieces of meat according to claim 11, wherein two injection needle cylinders are always disposed on top of each other, and including gliders provided in the area of the injection needles of the injection needle cylinder tubes on both sides of the transport path for the pieces of meat passing between the cylinders of the injection needle cylinders, said gliders being formed of several sliding bars extending in said transport direction in gaps between the injection needles, said bars being connected to each other and being mounted at the housing in supports which allow movement of the gliders backwards, increasing the distance from the opposite glider, against the force of a restoring element and forward up to a stop.

13. Device according to claim 1 or 5, wherein at least two injection needle cylinders are disposed with a safety distance between needle points thereof one behind the other in the transport direction, with their axes parallel and their axes of rotation in one plane, and including a co-traveling conveyor device provided below said injection needle cylinders, a drive of said conveyor device being coupled to the drive of the injection needle cylinders; and a plurality of sliding bars connected to each other and movable in the vertical direction serving as stripper rakes for the pieces of meat, said bars being disposed in the vicinity of the injection needle cylinders underneath their axes of rotation and in the spaces between the needle circles.

14. Device according to claim 5, wherein said transport device includes an endless belt having several sections connected to each other in an articulated manner.

* * * * *